United States Patent [19]

Falletta et al.

[11] 3,812,960

[45] May 28, 1974

[54] BOX FOR TAPE REELS

[75] Inventors: Thomas S. Falletta, Smithtown; Paul Jones Pugliese, Peekskill, both of N.Y.

[73] Assignee: Harcourt Brace Jovanovich, Inc., New York, N.Y.

[22] Filed: Apr. 14, 1971

[21] Appl. No.: 133,998

[52] U.S. Cl. ................206/387 F, 40/312, 206/459, 312/10

[51] Int. Cl. ........................ B65d 85/67, B65h 55/00

[58] Field of Search .......... 40/16, 17, 312; 206/1 R, 206/52 R, 52 F, 59 C, 59 E, 45.34, 65 R, DIG. 24, DIG. 29, DIG. 36; 211/40; 312/10, 8, 9; 220/22, 31 S

[56] References Cited

UNITED STATES PATENTS

| | | | |
|---|---|---|---|
| 2,321,794 | 6/1943 | Braun | 312/10 X |
| 2,899,074 | 8/1959 | Gullixson | 211/40 |
| 3,209,904 | 10/1965 | Mathus et al. | 206/52 F |
| 3,297,153 | 1/1967 | Fattori | 206/52 F |
| 3,338,421 | 8/1967 | Lyman | 312/10 X |
| 3,348,668 | 10/1967 | Amatsu et al. | 206/52 F |
| 3,352,478 | 11/1967 | Wood | 206/DIG. 29 |
| 3,393,444 | 7/1968 | Peters et al. | 220/31 S X |
| 3,603,478 | 9/1971 | Connan | 220/31 S UX |
| 3,613,895 | 10/1971 | Larkin | 312/8 X |

*Primary Examiner*—William I. Price
*Assistant Examiner*—Steven E. Lipman
*Attorney, Agent, or Firm*—Kenyon & Kenyon Reilly Carr & Chapin

[57] ABSTRACT

A box for magnetic tape reels, which includes a hollow housing provided with vertically spaced upper and lower walls with an opening between them at one end of the box. Sets of rib pairs are provided within the housing, with each rib pair including an upper rib extending along and downwardly from the upper wall and a lower rib spaced below and aligned with the upper rib, connected to the lower wall. The tape reels are slid into the interior of the housing, so that each tape reel is mounted between one of the rib pairs with the upper and lower ribs entering and passing between the reel flanges to locate the reel within the box.

15 Claims, 6 Drawing Figures

INVENTORS
THOMAS S. FALLETTA
PAUL JONES PUGLIESE

INVENTORS
THOMAS S. FALLETTA
PAUL JONES PUGLIESE

BOX FOR TAPE REELS

BACKGROUND OF THE INVENTION

This invention relates to a box for storing reels of tapelike material. In particular this invention relates to a box for storing reels of magnetic tape used for language instruction and other educational purposes.

School language teaching using tape recording systems, frequently involves the school in storing sets of language instruction tapes each comprising a large number of different reels of magnetic tape corresponding to different languages and different levels of instruction. At present each reel of tape is usually packed in an individual cardboard box having a lift-off lid. Although simple and widely practiced, the use of individual cardboard storage boxes for the tapes is attended with numerous problems.

For example, cardboard boxes after several months of intensive use can deteriorate rapidly with the result that the identifying indicia may become peeled off the outside of the boxes, the boxes may acquire a shabby appearance, and may finally provide an inadequate amount of protection for the tapes within. Problems can also arise in stacking the tapes. If the boxes are stacked either side-to-side or on top of each other, it is necessary to remove each box completely from the stack before the lid can be removed to provide access to the tape. Time is also lost, after returning each tape to its box, in restacking the boxes at the conclusion of a class. Additionally, in the initial loading of the boxes at the supplier, the aggregate work involved in loading each tape into an individual box separately is considerable.

Finally, providing an individual box for each tape can be a significant part of the cost of any particular tape set, e.g., a typical sixty tape set requires sixty, separate, cardboard boxes each bearing different indicia to indentify the tape within.

SUMMARY OF THE INVENTION

The present invention provides a box for reels, which obviates or minimizes problems of the type previously described.

More particularly, the present invention provides a rigid box for reels of the type in which each reel includes two circular flanges connected by a hub which supports the flanges in spaced parallel relation to define a gap between them. The box includes a generally rectangular housing having upper and lower walls. Connected with the housing is at least one rib pair which includes a longitudinally extending upper rib connected with the upper wall extending downwardly from it, and a lower rib spaced below and aligned vertically with the upper rib. The lower rib, which is generally coextensive with the upper rib projects upwardly from the lower wall. A reel, positioned vertically, may be mounted on the rib pair by sliding it inwardly of the box so that the upper and lower ribs of the pair enter the gap between the flanges of the reel. The width of the ribs is generally equal to the width of the gap but sufficiently less to provide a loose sliding fit. Thus the reel is supported against lateral displacement in the box, with the bottom ends of the flanges resting on the lower wall to provide vertical support. Several rib pairs are provided, to permit several reels to be stored within one box.

To insure that adjacent flanges of adjacent reels within the box do not touch, thus facilitating easy removal of each reel from the box without catching against its neighbor, the ribs are spaced apart by a distance greater than twice the thickness of one of the reel flanges, so that adjacent reel flanges have an intervening space between them.

The box is made of at least partially transparent material so that printed material identifying the tapes within the box may be positioned within the interior of the box. Identifying material is also provided on the interior of a lid which is provided at the open forward end of the box, to close the box and prevent the ingress of dust, dirt, etc. when the tapes are not in use.

Although designed in connection with the storage of reels for magnetic tape, it will be appreciated that this invention is equally applicable for the storage of reels for other flexible, strip material such as movie film, ribbon, wire, cord or the like.

THE DRAWINGS

A box for reels constructed in accordance with one preferred embodiment of the invention, is illustrated in the accompanying drawings in which, FIG. 1 is a perspective view of a box for reels constructed in accordance with the preferred embodiment of the invention showing a lid at the forward end of the box in an open position, FIG. 2 is a cross-sectional, end view of the box for reels shown in FIG. 1 taken along the lines 2—2 therein, FIG. 3 is a perspective view from the rear end of the box for reels shown in FIG. 1, FIG. 4 is a cross-sectional, top view of the box for reels shown in FIG. 3 taken along the lines 4—4 therein, with the lid of the box closed and with three reels shown within the box, FIG. 5 is a cross-sectional, top view of the forward end portion of the box shown in FIG. 4 but with the lid open and one reel partially withdrawn; and FIG. 6 is a perspective view of several of the boxes, each constructed in accordance with the preferred embodiment of the invention shown in FIG. 1, with the boxes shown stacked on a shelf for exemplary purposes.

DETAILED DESCRIPTION

Figures 1, 2:
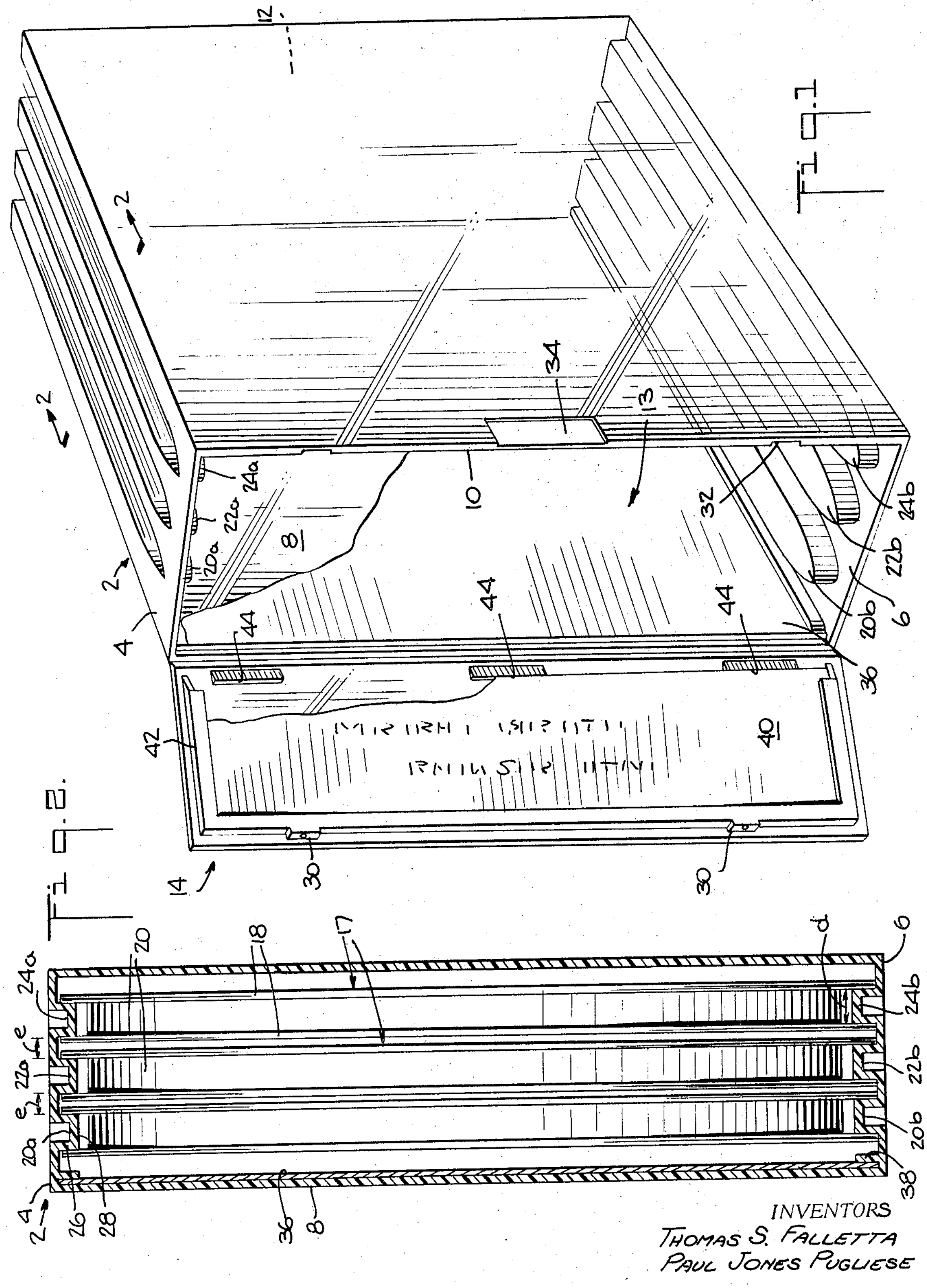
Figures 3, 4, 5, 6:
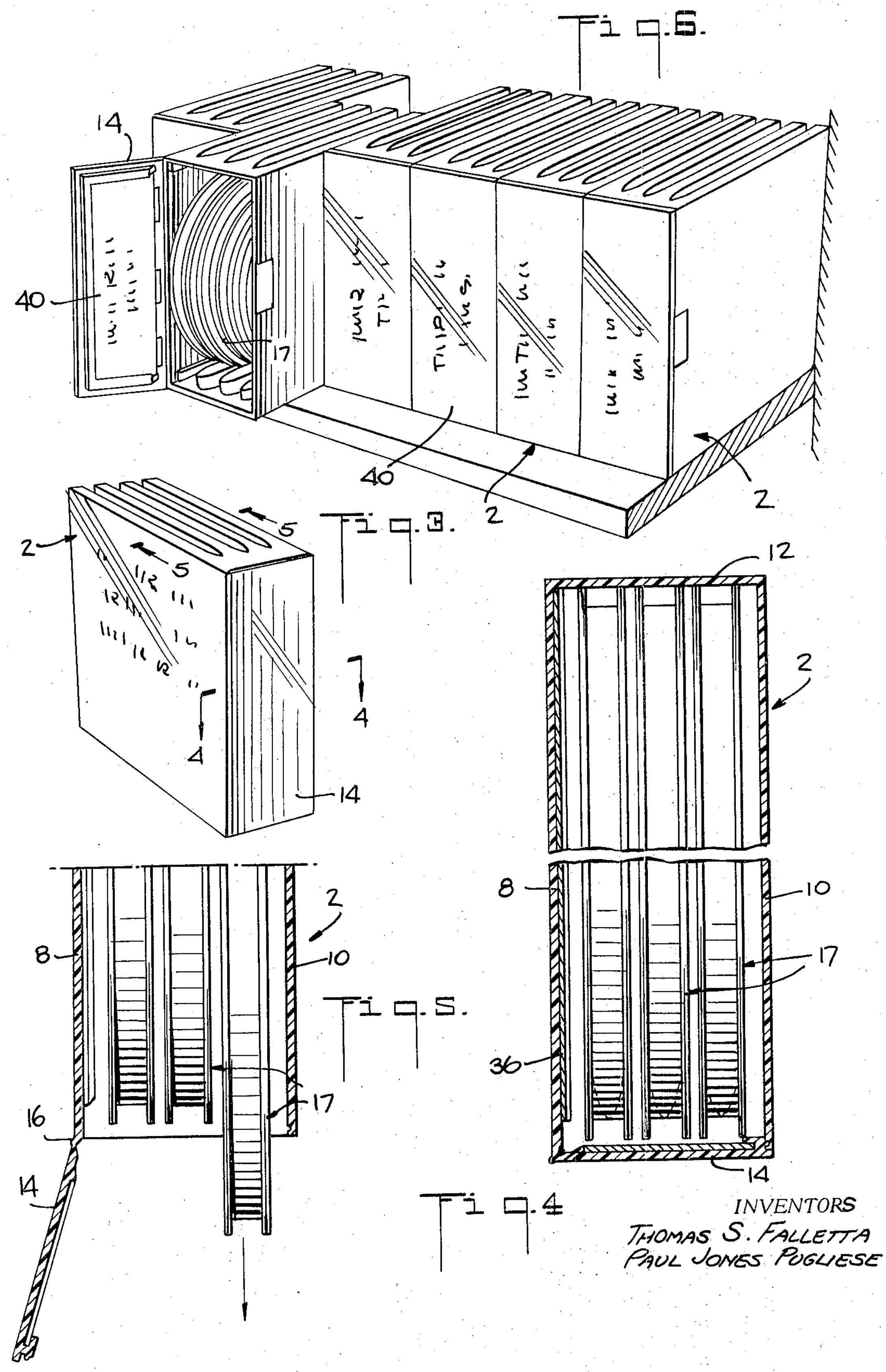

Referring to FIGS. 1 and 3 of the drawings, a box for reels constructed in accordance with the preferred embodiment of the invention, is there shown.

The box includes a rectangular housing 2 defined by horizontal, longitudinally extending upper and lower walls 4 and 6, respectively and by spaced, vertical, left and right sidewalls 8 and 10 respectively. The housing 2 is open at its forward end and has a vertical end wall 12 closing the rear end of the box. An opening 13 extends between the upper and lower walls at the forward end of the housing 2 and may be closed by a vertically extending lid 14 hingedly connected to the left sidewall 8.

The housing 2, and all parts of it to be described hereinafter, are formed integrally in a single molding operation out of a suitable plastic material which, in the preferred embodiment, is polypropylene. The advantages of polypropylene for the present purpose, are its strength, lightness and at least partial transparency. Another important advantage of polypropylene is its ability to form a "living hinge" which is utilized in the formation of an integral vertical hinge piece 16 (FIG. 5) connecting the lid 14 to the left sidewall 8 for hinging motion about a vertical axis. Other suitable materials possessing these desirable properties may however be used.

The box is intended to receive and house reels of magnetic tape such as the conventional reel 17 shown in FIG. 2. Typically each reel 17 includes two coextensive circular flanges 18 supported in spaced relation by a central hub (not shown) to define a uniform gap *d* between the flanges. A roll 20 of tape-like material wound concentrically on the reel 17, has a diameter less than the diameter of the flanges 18 leaving an unobstructed space between the edges of the flanges in the outer peripheral region of each reel.

In the preferred embodiment of the box shown in FIG. 1, the housing is designed to accommodate three reels and discussion of a three reel box will be provided hereinafter. However, it will be appreciated that boxes to house differing numbers of reels may be provided.

The structure (FIG. 1) provided to locate the reels 17 within the box includes three ribs pairs 20*a*, 20*b*; 22*a*, 22*b* and 24*a*, 24*b*, with each rib pair comprising an upper rib depending from the upper wall 4 and a lower rib coextensive and aligned vertically with the upper rib, extending upwardly from the lower wall 6.

Considering, for example, the rib pair comprising the ribs 20*a* and 20*b*, each of the ribs extends longitudinally of the housing 2 parallel to the sidewalls, from the rear wall 12 forwardly towards the open end of the housing. Each rib is defined by vertical sidewalls 26 (FIG. 2) which are parallel for the major portion of the length of the rib, and by a flat, horizontal wall 28. Adjacent the open forward end of the housing, the sidewalls 26 of each rib converge to provide a tapered, nose-like portion at the start of each rib.

The distance between the outer surfaces of the sidewalls 26 of each rib in the region where the sidewalls 26 are parallel, is approximately equal but slightly less than the gap distance *d* between the flanges of each reel. Additionally, the vertical spacing between the opposed surfaces of the end walls 28 of the ribs comprising each rib pair is less than the diameter of the flanges of the reel but greater than the diameter of the roll 20 of tape on the reel.

Thus, as a reel 17 is slid inwardly of the housing 2 in alignment with one of the rib pairs, e.g., the rib pair 20*a*, 20*b*, the upper and lower ribs 20*a* and 20*b* pass between the flanges of the reel in the peripheral region between the outside of the flanges and the outside of the tape. The reel thus becomes aligned in parallel relation to the sidewalls of the housing at a fixed location in the box established by the location of the rib pair. At the lower end of the reel, the bottoms of the flanges 18 rest upon the lower wall 6 to support the reel vertically.

In an important feature of the invention, the lateral spacing between the facing side surfaces of the sidewalls 26 of adjacent ribs (the dimension *e* shown in FIG. 2) is more than twice the thickness of the reel flanges. As a result, two adjacent reels 17 mounted on the adjacent rib pair will be held with the facing surfaces of their adjacent flanges 18 held out of contact with each other. As a result, the flanges of adjacent reels do not interfere with each other or, bind together, thus providing for easy removal of each reel from the box without interference with its neighbors (FIG. 5).

Insertion of the reels into the box is facilitated by the previously described tapered nose pieces on each of the ribs. By grasping three reels together in one hand and the box in the other, and by feeding the reels into the box the nose pieces of the ribs start to enter the gaps between flanges of the reels. As closing motion is continued, the nose pieces of the ribs automatically center the reels onto the ribs, so that the reels are automatically moved apart as they enter the box to the spaced position already described. Eventually, further motion of the reels into the box is limited by impingement of the reel flanges on the rear wall 12 (FIG. 4).

Subsequently the lid 14 may be swung-to to close the box. Projecting detents 30 (FIGS. 1 and 5) on the interior of the lid 14 snap into mating recess portions 32 on the interior of the right sidewall 10 to hold the lid closed against accidental opening. A recessed finger portion 34 in the outer surface of the right sidewall 10 is provided so that a finger may be placed under the lid to open it against the action of the detents 30 when it is desired to gain access to the tapes within.

To provide identification of the reels within the box, a title card 36 (FIG. 1), generally coextensive with the interior of the left sidewall 8, is provided. The title card, which bears indicia identifying the reels within, is slid into channels adjacent the upper and lower ends of the sidewall 8 defined by longitudinally extending channel members 38 extending inwardly from the upper and lower walls in closely spaced relation to the left sidewall 8. The indicia on the card 36 may be read through the at least partially transparent sidewall 8.

A lid card 40, bearing identifying indicia on both its inner and outer surfaces, is supported against the interior of the lid by a U-shaped channel member 42 integral with the interior of the lid extending about and adjacent its peripheral surfaces. The card 40, once it has been snapped into position within the channel piece 42 is prevented from falling out by stop pieces 44. The indicia on the lid 40 may be read either through the lid material when the lid 14 is closed, or directly on the interior of the lid card 40 when the lid is open.

In the retailing of language tapes, a typical set may comprise some sixty or so tapes covering several different languages and different levels of instruction. Using, for example, boxes adapted to contain three reels each, the boxes could be stacked on shelves in side-by-side relation as shown in FIG. 6. The indicia identifying each tape can be read from the lid card 40 of each box, even though the wall cards 36 are obscured in the side-by-side stacked relation. Significantly, it will not be necessary to remove each box from the stack to remove the tapes as access to the interior of the box can be obtained through the hinged lid while the box remains in the stack. Additionally, the total number of boxes required is significantly reduced by providing boxes that contain more than one reel each thereby providing significant economies.

What is claimed is:

1. A box for at least two tape reels, each reel being of the type wherein a pair of coextensive circular flanges are connected by a central hub which supports the flanges in spaced parallel relation to define a uniform gap therebetween, the box comprising, a generally rectangular, hollow housing having opposed upper and lower walls spaced vertically by a distance sufficient to provide clearance for the outside diameters of the reel flanges and with an opening therebetween at one end of said housing communicating with the interior thereof, two parallel side walls extending vertically between said upper and lower walls along the opposite edges thereof for a depth sufficient to completely receive the reels, at least two rib pairs extending side-by-side from adjacent said opening into the interior of said housing in spaced parallel relation to said side walls, each said rib pair including, an upper rib connected with said upper wall extending downwardly therefrom, a lower rib spaced below and generally coextensive with said upper rib, said lower rib connected with said lower wall projecting upwardly therefrom;

said ribs for a major portion of their length being of a width generally equal to the gap between the flanges of each reel, said upper and lower ribs of each said rib pair entering and sliding between the flanges of a reel upon sliding thereof through said opening into said housing, adjacent said rib pairs being spaced laterally apart a sufficient distance to support adjacent flanges of adjacent reels out of touching contact with each other.

2. A box for at least two tape reels as defined in claim 1 wherein for each of said ribs in a region thereof adjacent the open end of said housing the associated side surfaces of said ribs coverge inwardly to define a tapered lead-in portion of said rib, said lead-in portion initially entering the gap between the flanges of the reel and assisting in guiding the reel onto said rib.

3. A box for at least two tape reels as defined in claim 1 wherein said housing is formed of at least partially transparent material, said housing further including guide means connected with said housing for holding a card bearing visible indicia within said housing generally flush against the interior of at least one of said side walls with the indica facing the wall, whereby the indicia can be read from the outside of the box.

4. A box as defined in claim 1 further including, a lid; and hinge means integral with said lid and said housing for hinging motion of said lid between an open position in which said opening is unobstructed and a closed position in which said lid completely closes said opening.

5. A box as defined in claim 4 further including, releasably engageable detent portions on said lid and said housing for resisting movement of said lid from the closed position thereof.

6. A box as defined in claim 4 wherein said lid is formed of at least partially transparent material, said lid further including card holding means for holding a printed card with a printed side against the interior surface of said lid, whereby the printing on the card can be read through the lid.

7. A box for at least two tape reels, each reel being of the type wherein a pair of coextensive circular flanges are connected by a central hub which supports the flanges in spaced parallel relation to define a uniform gap therebetween, the box comprising a generally rectangular housing having vertically spaced upper and lower walls, with an opening therebetween at one end of said housing communicating with the interior thereof, two spaced opposed housing side walls extending vertically between said upper and lower walls, at least two rib pairs adjacent said opening extending side-by-side into the interior of said housing in spaced parallel relation to said housing side walls, each said rib pair including, an upper rib connected with said upper wall extending downwardly therefrom, a lower rib spaced below and generally coextensive with said upper rib, said lower rib connected with said lower wall projecting upwardly therefrom;

each one of said ribs including two spaced rib side walls extending from the respective upper or lower wall vertically into the interior of said housing, each side wall being substantially thinner than half the width of the rib, and a rib horizontal wall connecting the interior extremities of said rib side walls, the horizontal wall being substantially thinner than the depth of the rib, whereby said rib side and horizontal walls define an identation along the outside surface of the associated one of said upper and lower walls extending parallel to said side walls, side rib side walls of said rib pairs being so positioned in relation to each other and to said side walls of said housing as to position the flanges of reels out of touching contact with each other and out of contact with said side walls of said housing.

8. A box for at least two tape reels as defined in claim 7 wherein each reel has wound concentrically thereon a roll of tape-like material having a diameter less than the diameter of the flanges, the rib horizontal walls of each rib pair in the box including:

parallel, opposed, horizontal surfaces, said surfaces being spaced vertically by a distance greater than the diameter of the roll of tape-like material but less than the diameter of the flanges.

9. A box as defined in claim 7 wherein the surfaces of the side walls of each rib in the interior of the housing are spaced apart at a lateral distance approximately equal to the gap between the flanges of each reel, said upper and lower ribs of each said rib pair entering between the flanges of a reel upon sliding the reel through the opening into the housing.

10. A box as defined in claim 9 wherein each of the ribs extends to the end of the housing opposite the opening, whereby the indentation defined by said rib side and horizontal walls extends to said opposite end of the housing.

11. a box for at least two tape reels as defined in claim 7 wherein for each of said ribs in a region thereof adjacent the open end of said housing the associated side surfaces of said rib converge inwardly to define a tapered lead-in portion of said rib, said lead-in portion intially entering the gap between the flanges of the reel and assisting in guiding the reel onto said rib.

12. A box for at least two tape reels as defined in claim 7 wherein said housing is formed of at least partially transparent material, said housing further including guide means connected with said housing for holding a card bearing visible indicia within said housing generally flush against the interior of at least one of said side walls, with the indicia facing the wall, whereby the indicia can be read from the outside of the box.

13. A box as defined in claim 7 wherein the box is constructed of molded plastic and further comprises:

an end wall for closing the end of the housing opposite the opening;

a lid integrally molded with said housing; and hinge means integrally molded along one edge of the lid and a corresponding edge of the housing adjacent the opening for hinging motion of said lid between an open position in which said opening is unobstructed and a closed position in which said lid completely closes said opening.

14. A box as defined in claim 13 further comprising: releasably engageable detent portions on said lid and said housing for resisting movement of said lid from the closed position thereof.

15. A box as defined in claim 13 wherein the plastic is at least partially transparent, and the lid further comprises: card holding means for holding a card inscribed with visible indicia on at least one side with an inscribed side against the interior surface of said lid, whereby the indicia on the card can be read through the lid.

* * * * *

UNITED STATES PATENT OFFICE
CERTIFICATE OF CORRECTION

Patent No. 3,812,960 Dated May 28, 1974

Inventor(s) Thomas S. Falletta and Paul Jones Pugliese

It is certified that error appears in the above-identified patent and that said Letters Patent are hereby corrected as shown below:

Column 4, line 41, after "lid" and before "40" insert --card--.

Column 6, line 24, change "identation" to --indentation--.

Column 6, line 26, after "said side walls," and before "rib side" change "side" to --said--.

Column 6, line 53, after "11." and before "box" change "a" to --A--.

Signed and sealed this 1st day of October 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
★ U.S. GOVERNMENT PRINTING OFFICE : 1969 O—366-334.